(12) United States Patent
Seol

(10) Patent No.: US 9,919,180 B2
(45) Date of Patent: Mar. 20, 2018

(54) TRANSMISSION DEVICE FOR BODYBUILDING DEVICE OR BICYCLE

(71) Applicant: VIVASPORTS CO., LTD., Seoul (KR)

(72) Inventor: Kyung Woo Seol, Taichung (KR)

(73) Assignee: VIVASPORTS CO., LTD., Seoul (KR)

( * ) Notice: Subject to any disclaimer, the term of this patent is extended or adjusted under 35 U.S.C. 154(b) by 0 days.

(21) Appl. No.: 15/364,005

(22) Filed: Nov. 29, 2016

(65) Prior Publication Data

US 2018/0043203 A1   Feb. 15, 2018

(30) Foreign Application Priority Data

Aug. 9, 2016   (TW) .............................. 105212144 U

(51) Int. Cl.
*A63B 22/06*   (2006.01)
*A63B 21/00*   (2006.01)

(52) U.S. Cl.
CPC ........ *A63B 21/159* (2013.01); *A63B 22/0605* (2013.01)

(58) Field of Classification Search
CPC .......................... A63B 21/159; A63B 22/0605
See application file for complete search history.

(56) References Cited

U.S. PATENT DOCUMENTS

| 3,704,886 | A | * | 12/1972 | Kay | .................... | A63B 21/0125 |
|  |  |  |  |  |  | 482/119 |
| 4,630,839 | A | * | 12/1986 | Seol | ........................ | B62M 1/28 |
|  |  |  |  |  |  | 280/236 |
| 5,163,886 | A | * | 11/1992 | Seol | ..................... | A63B 21/015 |
|  |  |  |  |  |  | 482/52 |
| 5,551,718 | A | * | 9/1996 | Toronto | ................... | B62M 1/30 |
|  |  |  |  |  |  | 280/252 |
| 5,643,146 | A | * | 7/1997 | Stark | .................... | A63B 21/015 |
|  |  |  |  |  |  | 482/5 |
| 2006/0270527 | A1 | * | 11/2006 | Hanaya | .................. | A63B 24/00 |
|  |  |  |  |  |  | 482/57 |
| 2010/0051373 | A1 | * | 3/2010 | Lee | .......................... | B62M 6/55 |
|  |  |  |  |  |  | 180/206.4 |

* cited by examiner

*Primary Examiner* — Andrew S Lo
(74) *Attorney, Agent, or Firm* — Andrew C. Cheng

(57) ABSTRACT

A transmission device is provided for bodybuilding devices or bicycles, including an axle that is operatively coupled to a sprocket assembly for collaborative operation. Two cranks are provided, having contact surfaces including one way bearing mounted thereto for fitting to two ends of the axle. Two clutch control assemblies are controllable through a wire control assembly such that the clutch control assemblies are selectively engageable with or disengageable from two cranks respectively to set the cranks in an operation mode of regular bicycle pedaling or an operation mode of one side pedaling alone or two side parallel pedaling. An important feature is that the wire control assembly is of an arrangement involving a mateable combination of two halves of which the parts are made of plastics, where assembly for centering is achieved with recess-projection engagement for better assembly accuracy.

9 Claims, 16 Drawing Sheets

TRANSMISSION DEVICE FOR BODYBUILDING DEVICE OR BICYCLE

BACKGROUND OF THE INVENTION

1. Field of the Invention

The present invention relates to the field of treading devices, and more particularly to one that provides, technically, a transmission device for bodybuilding devices or bicycles.

2. The Related Arts

Taiwan Patent Application No. 80200373 discloses a transmission device of a multifunctional bicycle, which comprises a rotatable axle mounted in an axle sleeve of a frame and a sprocket fixing disc and a locking disk provided at each of two ends of the axle, with cranks carrying one-way bearings being then mounted to two sides thereof. Arranged on an inner side of a fitting section of each of the two cranks are, in sequence, a rotatable circular alternating disk and a slide locking disc comprising a plurality of axial, semi-circular recesses formed in an inner diameter thereof. The slide locking disc matches semi-circular recesses provided on an outer diameter of the fitting section of the crank with balls filled therebetween to make it only possible to move horizontally on the crank, but no rotation. The horizontal movement of the slide lock disk allows for combination with the circular alternating disk, or allowing for combination with the locking disk or the sprocket fixing disc. A secondary axle sleeve is provided on the frame at a location under the axle sleeve and receives therein a secondary axle that has two ends to which a sprocket is mounted with two chains of carefully calculated length fixed to the sprocket at one end and the circular alternating disk of the crank at the other end so that when viewed from a lateral side, the two chains show an X-shape connection configuration such that when one of the circular alternating disks is rotated downward, the other one is rotated upward, exhibiting an alternating operation. The secondary axle sleeve is provided, on a top side thereof, with horizontal carriers on two sides respectively rotatably coupled to a control crank arm and each has a pivot shaft over which a spring is fit to provide the two control crank arms with inward contraction forces. Tops of the two control crank arms are respectively fit to the slide locking discs, while tail ends of the control crank arms are connected through a wire to a control handle so that by adjusting the control handle to drive or release the wire, the control crank arms may operate the slide locking discs to move leftward or rightward. With such an assembly, through adjusting the control handle, it is possible to selectively set the bicycle in an up-down alternating leverage type operation or a regular crank rotation operation, or achieving independent operations of the two cranks to drive the axle for rotation in a single direction.

Such a conventional transmission mechanism of the multifunctional bicycle has a very complicated structure and a large number of positions of the parts must be precisely set for slight skewing may lead to unsmooth transmission or even damage. Thus, the assembly is quite cumbersome and tedious. Most the parts are made of metals. This increases the weight and also makes the manufacture difficult for the operations of assemble and welding are difficult. Further improvements are required.

In consideration of the drawbacks of the prior art discussed above, it is a challenge of those involved in this field to provide a novel structure that helps overcome or alleviates the above problems.

In view of this, the present invention aims to provide a technical solution that overcomes the drawbacks of the prior art.

SUMMARY OF THE INVENTION

The primary objective of the present invention is to provide a transmission device for bodybuilding devices or bicycles, which has a general feature that comprises a wire control assembly that is made in a design comprising two halves mating and combinable with each other for easy assembly and parts thereof being made of plastics, the parts being of the same specifications of conventional or known bicycles, wherein assembly for centering is achieved with recess-projection engagement for better assembly accuracy and left-hand side and right-hand side cranks are securely fixed by using nuts of different handedness to prevent undesired loosening, such that designs of parts are oriented toward being simplified and more accurate to greatly lower down failure rate.

To achieve the above objective, the present invention provides a transmission device for bodybuilding devices or bicycles, which comprises: an axle, wherein the axle is coupled, through a spline, to a sprocket assembly for collaborative operation for being put into movement simultaneously; two cranks comprising pedals attached thereto, wherein the two cranks have contact surfaces that are coupled to two ends of the axle and comprise one way bearings mounted thereto such that driving is achieved with a rearward rotation of the pedals 201 the two cranks and idling is present when rotation is made in a forward direction; and two clutch control assemblies, wherein the two clutch control assemblies are controlled by a wire control assembly such that the two clutch control assemblies are selectively put into engagement with or disengagement from the two cranks, wherein the two clutch control assemblies are only allowed to engage with the cranks that are set in a condition of being angularly shifted away from each other by 180 degrees thereby allowing the pedals of the two cranks to conduct a regular bicycle pedaling operation; and disengagement of the two clutch control assemblies from the two cranks provides operation flexibility to the pedals of the two cranks for selection among various operation modes, including one side pedaling alone or two side parallel pedaling.

BRIEF DESCRIPTION OF THE DRAWINGS

The present invention can be fully understood from the following detailed description and preferred embodiments with reference to the accompanying drawings, in which.

DETAILED DESCRIPTION OF THE PREFERRED EMBODIMENTS

Figure 1:
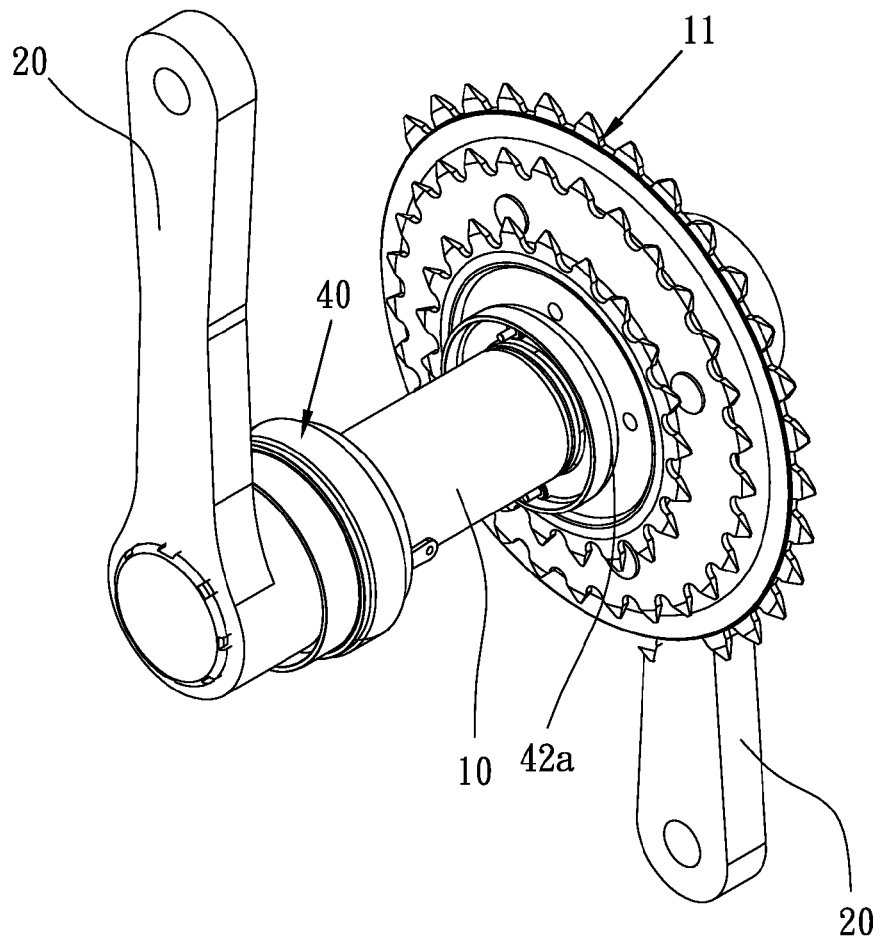
FIG. 1 is a perspective view showing an embodiment of the present invention.
Figure 2:
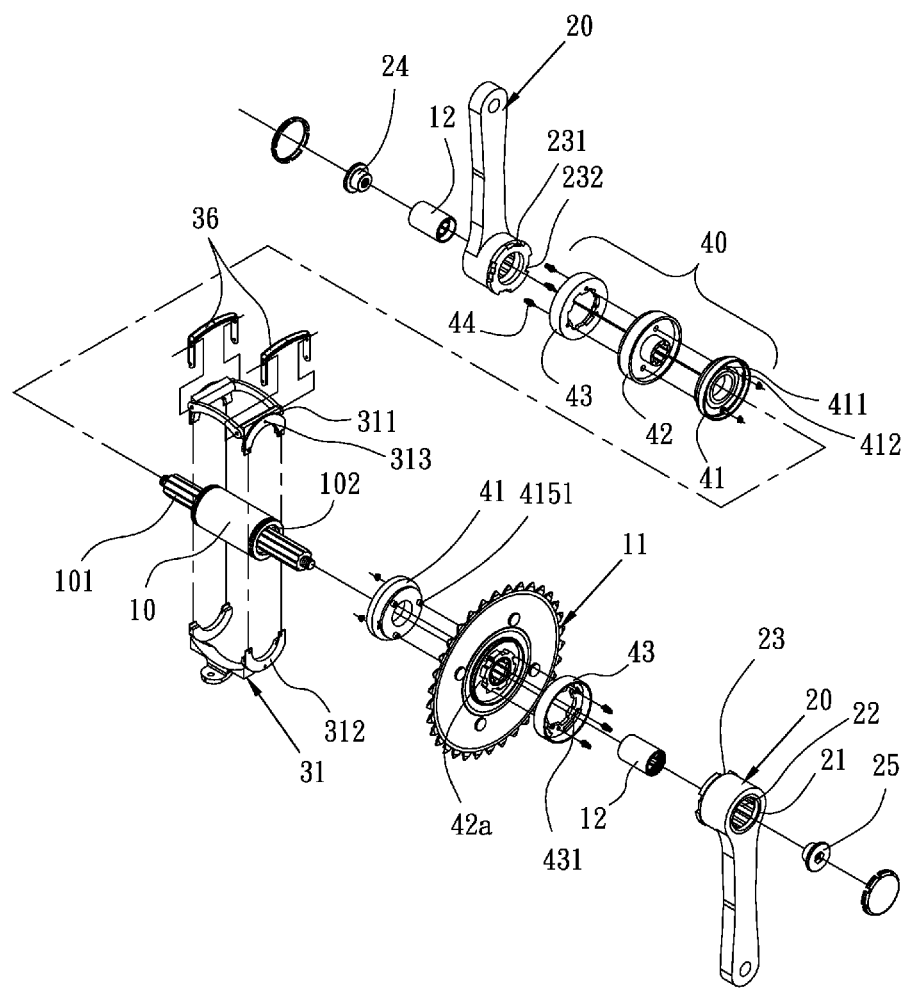
FIG. 2 is an exploded view showing the embodiment of the present invention.

The present invention provides a transmission device for bodybuilding devices or bicycles.

To better expound the purposes, features, and effectiveness of the present invention to help better understand and appreciate the present invention, description will be given below with reference to embodiments and drawings of the present invention.

Referring to FIGS. 1-6, the present invention provides transmission device for bodybuilding devices or bicycles, which comprises:

an axle 10, wherein the axle 10 is coupled, via a spline 101, to a sprocket assembly 11 to achieve a collaborative operation; the axle 10 having two ends each being fit into an axle sleeve 12;

two cranks 20 comprising pedals 201, wherein the pedals 201 of the two cranks 20 have operation end clamp hole 21 in each of which a one way bearing 22 is mounted, the pedals 201 of the two cranks 20 being coupled through the one way bearings 22 to outer circumferential surfaces of the axle sleeve 12; the pedals 201 of the two cranks 20 having surfaces facing toward the axle 10 and comprising a clutch tooth formation 23;

a wire control assembly 30, which comprises a clamp body 31 comprising an upper clamp member 311 and a lower clamp member 312, the clamp body 31 being coupled via a wire 32 to a wire control switch 33, an opposite end of the wire 32 being connected via an spring 34 to two elbow hook structures 35; pulling the wire 32 making the elbow hook structures 35 driven inwards and releasing the wire 32 allowing the spring 34 to bias the elbow hook structures 35 for position returning; and two clutch control assemblies 40, which each comprise a clamp slider 41, an intermediate ring 42, and a clutch 43, wherein for one of the clutch control assemblies 40, the intermediate ring 42 is arranged as an intermediate ring-sprocket assembly 42a, and wherein the clamp slider 41, the intermediate ring 42 or the intermediate ring-sprocket assembly 42a and the clutch 43 are combined together with three spring screws 44, the clamp slider 41 being provided with a spring bar 411 positioned against a side recess 313 of the clamp body 31, the clamp slider 41 being provided, on opposite sides thereof, with a square slot pin 412 for engagement with the elbow hook structures 35, such that when the elbow hook structures 35 drives the clamp slider 41, the clutch 43 is caused to collaboratively move for disengaging from the clutch tooth formation 23 of the pedal 201 of the crank 20, and when the elbow hook structures 35 return in position, the spring screws 44 force the clutch 43 to engage with the clutch tooth formation 23 of the pedal 201 of the cranks 20.

In the above-described transmission device for bodybuilding devices or bicycles, the pedal 201 of the right-hand side crank 20 is securely tightened with a left-handed nut 24, while the pedal 201 of the left-hand side crank 20 is securely tightened with a right-handed nut 25 in order to prevent loosening during an alternating operation.

In the transmission device for bodybuilding devices or bicycles, the axle 10 having side surfaces that are provided with recessed sections 102, such that the recessed sections 102 receive projecting portions of the axle sleeves 12 to insert therein for correct alignment with a center of the axle 10.

In the transmission device for bodybuilding devices or bicycles, the upper clamp member 311 and the lower clamp member 312 are made through plastic molding.

To recapitulate, the present invention provides a transmission device for bodybuilding devices or bicycles, which comprises an axle 10, wherein the axle 10 can be easily inserted through and combined with a bottom bracket 51 of a frame 50 of a bodybuilding bike or a bicycle and the axle 10 is coupled, through a spline 101, to a sprocket assembly 11 for collaborative operation for being put into movement simultaneously; two cranks 20 comprising pedals 201 attached thereto, wherein the two cranks 20 have contact surfaces that are coupled to two ends of the axle 10 and comprise one way bearings 22 mounted thereto such that driving is achieved with a rearward rotation of the pedals 201 of the two cranks 20 and idling is present when rotation is made in a forward direction; and two clutch control assemblies 40, wherein the two clutch control assemblies 40 are controlled by a wire control assembly 30 such that the two clutch control assemblies 40 are selectively put into engagement with or disengagement from the two cranks 20, wherein the two clutch control assemblies 40 are only allowed to engage with the cranks 20 that are set in a condition of being angularly shifted away from each other by 180 degrees thereby allowing the pedals 201 of the two cranks 20 to conduct a regular bicycle pedaling operation; and disengagement of the two clutch control assemblies 40 from the two cranks 20 provides operation flexibility to the pedals 201 of the two cranks 20 for selection among various operation modes, including one side pedaling alone or two side parallel pedaling. The primary consideration here is that the wire control assembly 30 comprises a clamp body 31 that involves an arrangement that comprises two halves combinable together for easy assembly and parts thereof are formed of plastics with the specifications of the parts being the same as regular or known bicycle, where assembly for centering is achieved with recess-projection engagement for better assembly accuracy and the left-hand side and right-hand side cranks 20 are securely fixed by using nuts of different handedness to prevent undesired loosening, such that designs of parts are oriented toward being simplified and more accurate to greatly lower down failure rate.

Referring to FIGS. 7-10, the wire control assembly 30 comprises a pair of pivot shafts 36. The pair of pivot shafts 36 is provided with four first pivot points 361 and four second pivot points 362. The first pivot points 361 are rotatably coupled to the clamp body 31 (see FIG. 2), and the four second pivot points 362 are rotatably coupled to an end of elbow joints 352 and a pivot end of four hook terminals 351. An end of the spring 34 is supported on the clamp body 31 (see FIG. 3), and an opposite end of the spring 34 is supported on a pivot seat 37. The pivot seat 37 comprises a compression spring 38 received in an interior space thereof and coupled to a wire fixing assembly 39. The wire fixing assembly 39 comprises a transverse screw 391 extending through the pivot seat 37, wherein the compression spring 38 to screw to a wire fixing seat 392 and a longitudinal screw 393 receiving an end of a wire 32 to wrap therearound and screwed to the wire fixing seat 392, so that the wire 32 is not allowed to directly pull and drive the pivot seat 37 and is instead operable through the compression spring 38 to drive the pivot seat 37, whereby the compression spring 38 functions as cushioning so that when one of the cranks 20 comes to a jammed condition, no over-pull of the wire 32 may happen and the cushioning provided by the compression spring 38 may also help to release the jammed condition to desirably extend the lifespan of the wire control assembly. Prior art arrangements involve no such a compression spring 38 so that pulling the wire 32 results in direct driving of the pivot seat 37, and in case of jamming of the cranks 20, over-pull of the wire 32 with an excessively large force might cause undesired damage of the wire control assembly 30.

Figure 3:
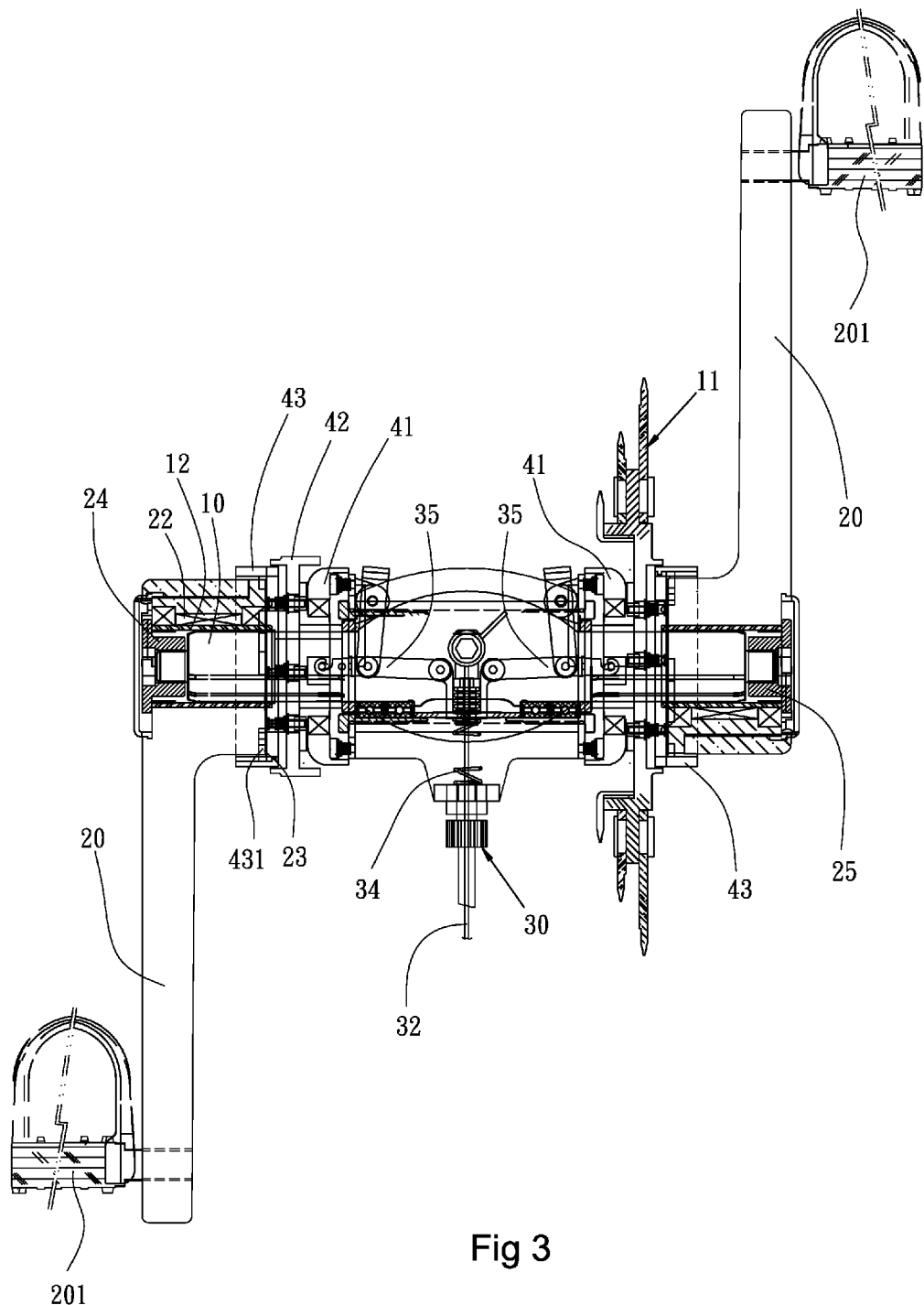
FIG. 3 is a plan view illustrating the embodiment of the present invention where engagement is made between two clutch control assemblies and two cranks to provide an operation mode of regular bicycle pedaling.
Figure 4:
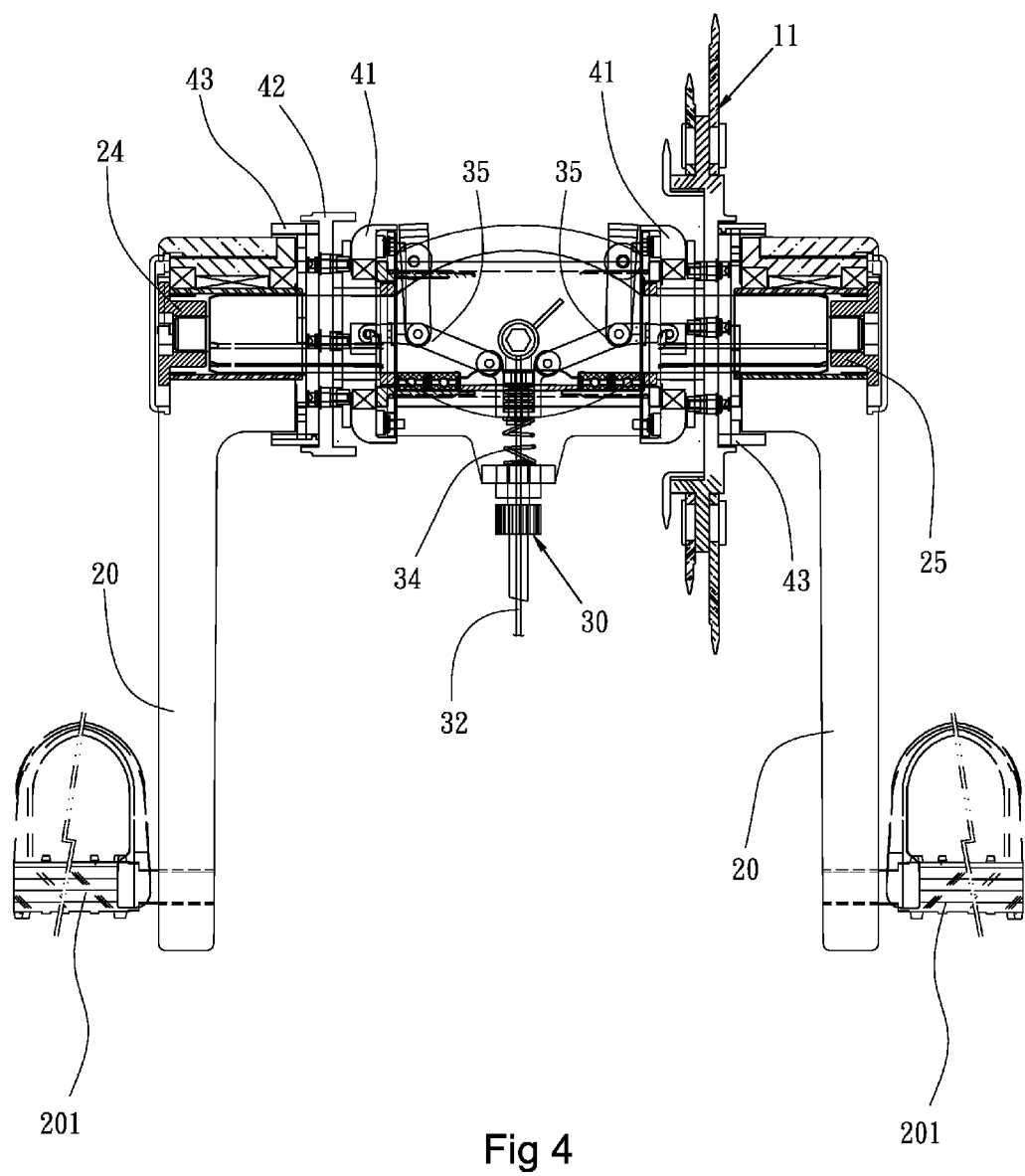
FIG. 4 is a plan view illustrating the embodiment of the present invention where the two clutch control assemblies disengage from the two cranks to provide operation modes where pedals can be operated independently or simultaneously and at the same direction.
Figure 5:
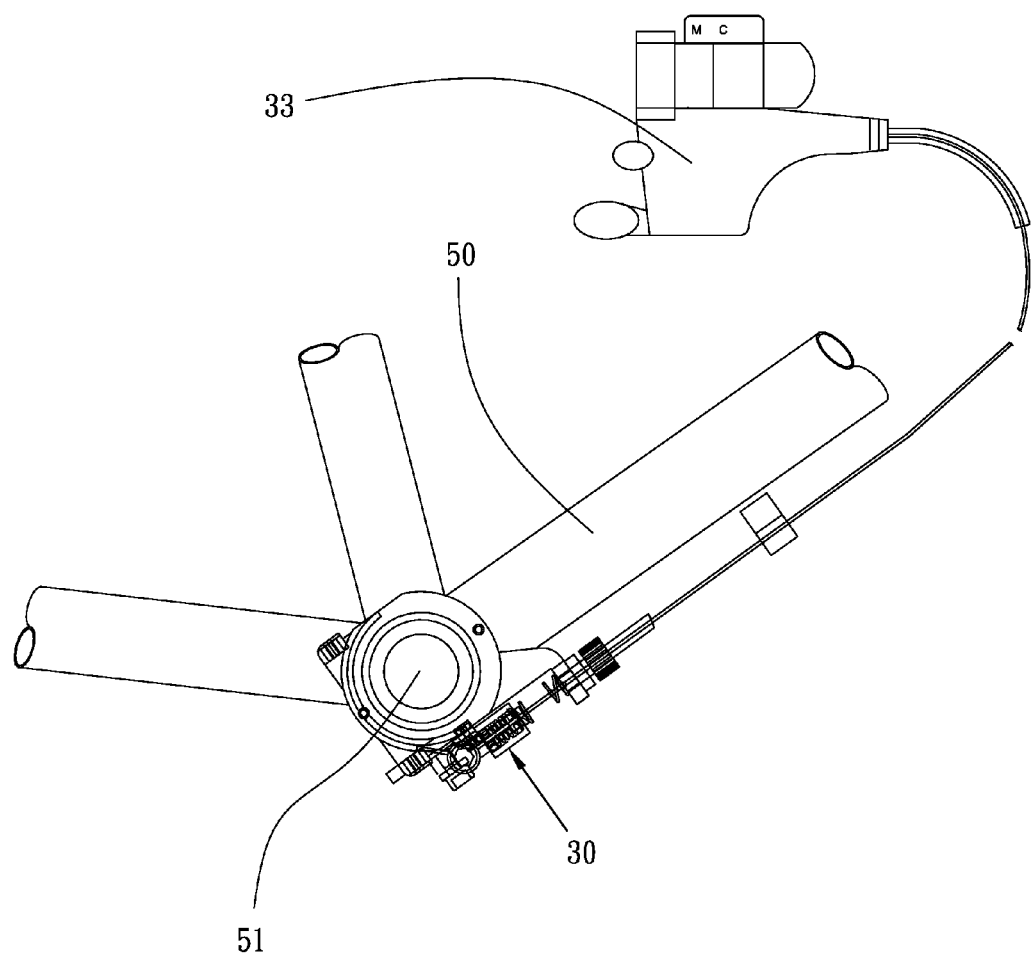
FIG. 5 is a side elevational view illustrating the embodiment of the present invention mounted to a bottom bracket of a frame and is connected to a wire control switch for wire control.
Figure 6:
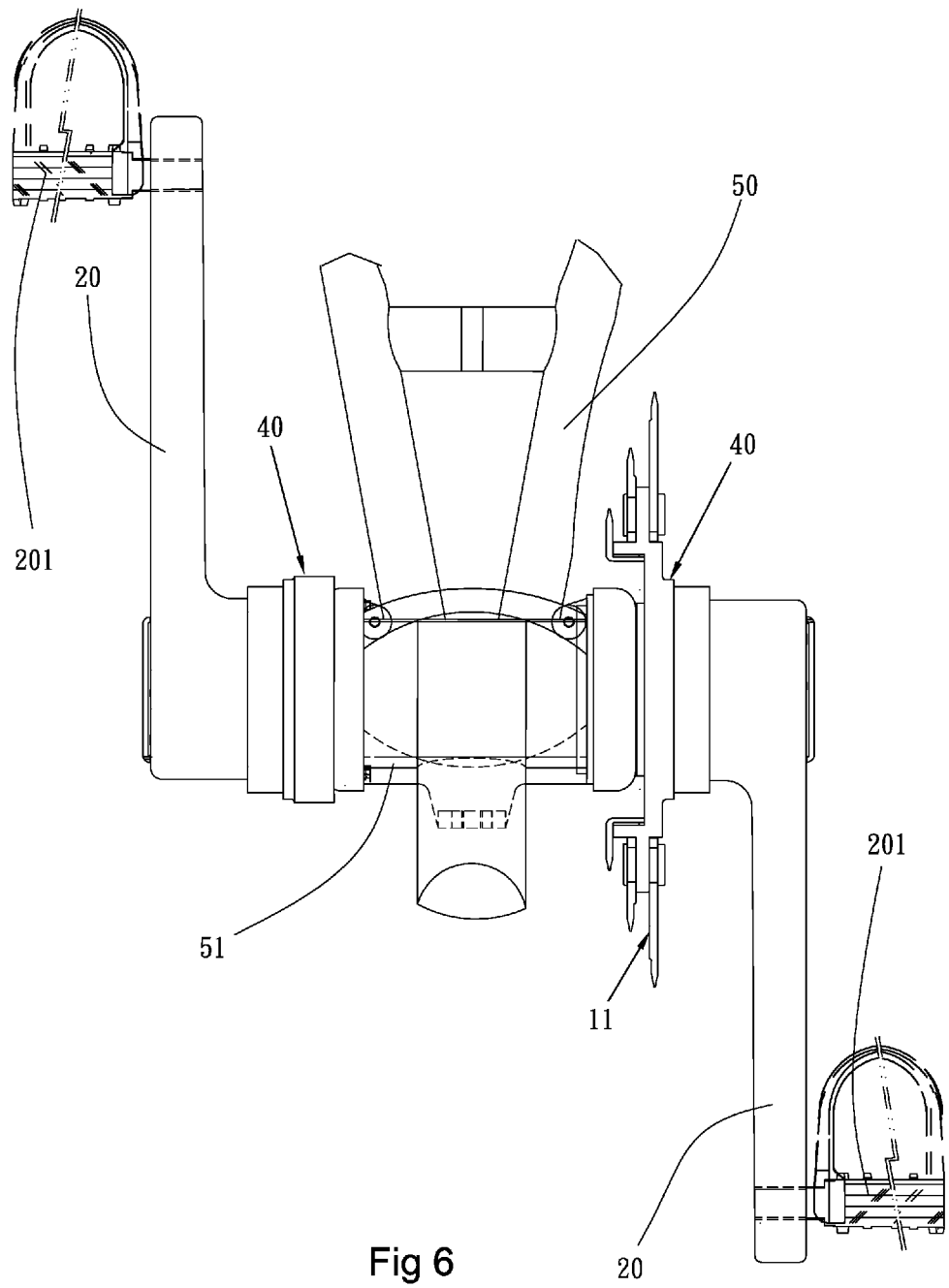
FIG. 6 is a top plan view illustrating the embodiment of the present invention mounted to the bottom bracket of the frame.
Figure 7:
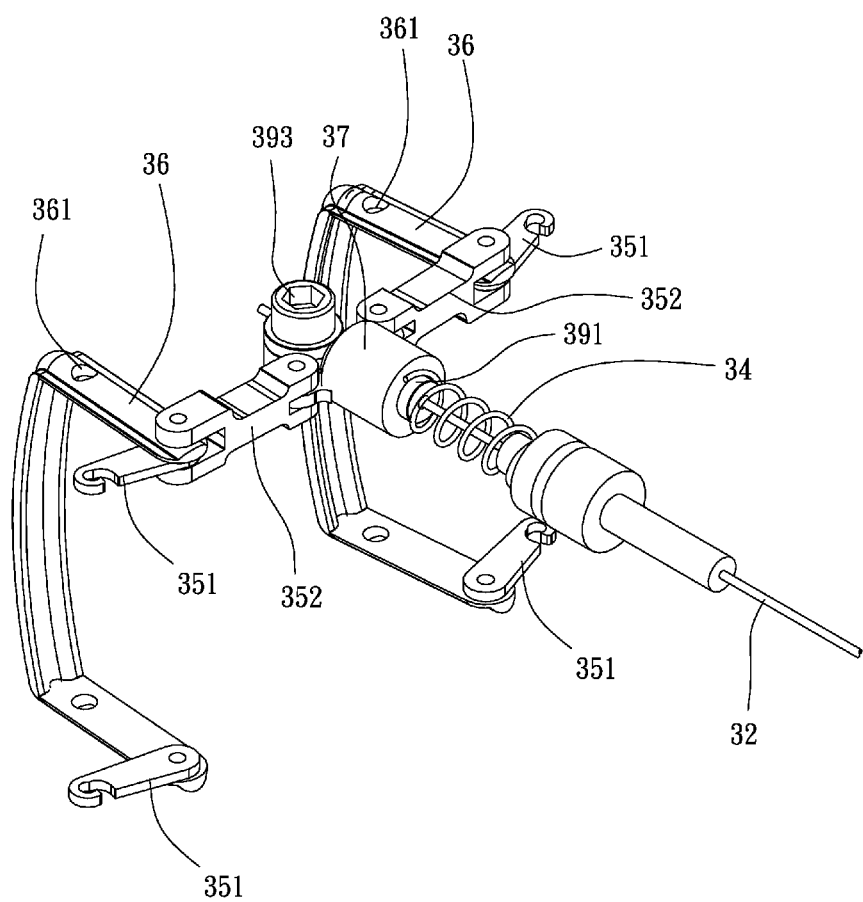
FIG. 7 is a perspective view showing a wire control assembly of the embodiment of the present invention.
Figure 8:
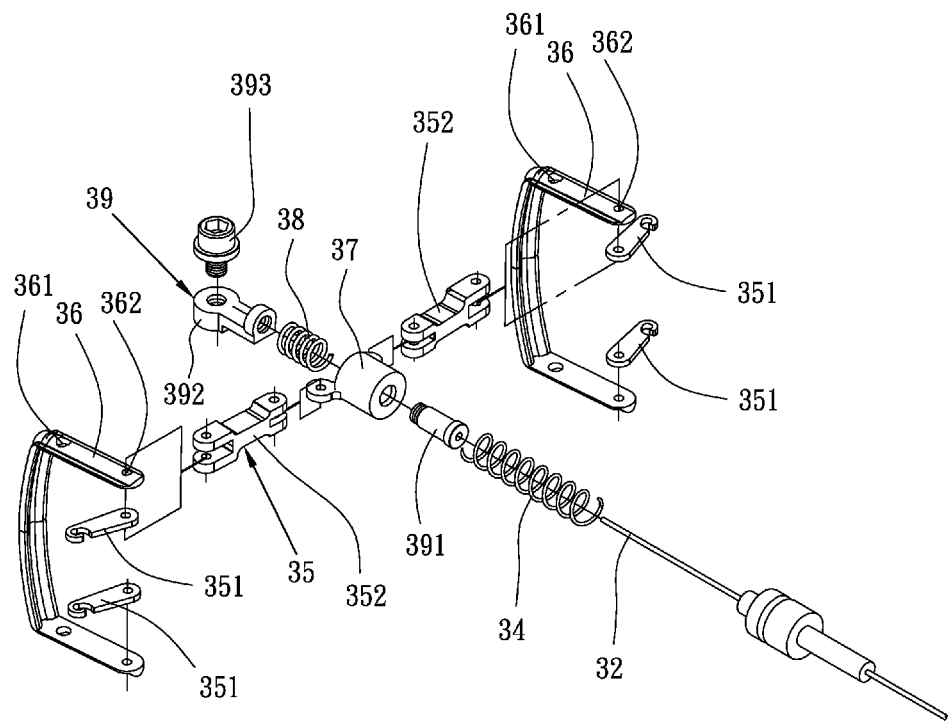
FIG. 8 is an exploded view showing the wire control assembly of the embodiment of the present invention.
Figure 9:
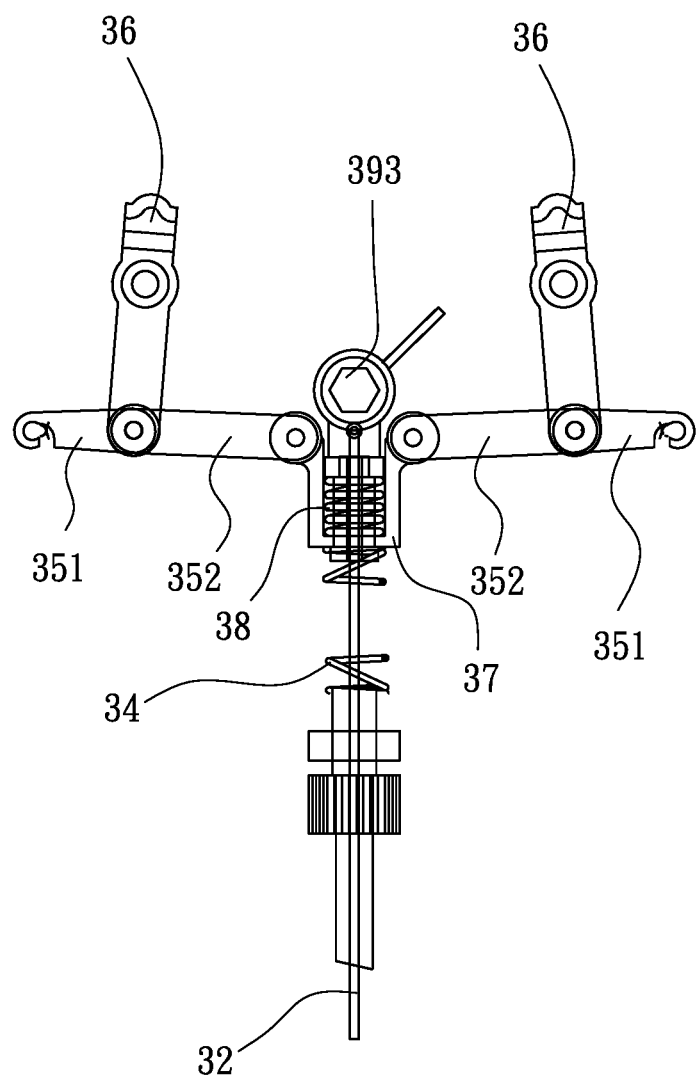
FIG. 9 is a schematic view illustrating the condition before the wire control assembly of the embodiment of the present invention is put into operation.
Figure 10:
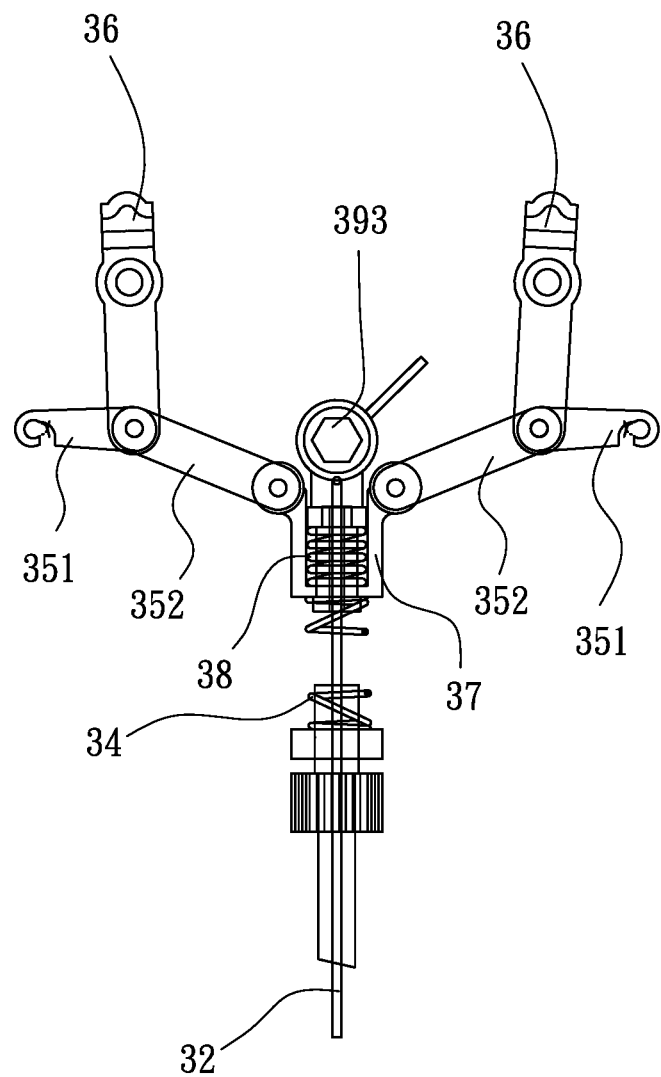
FIG. 10 is a schematic view illustrating the condition after the wire control assembly of the embodiment of the present invention is put into operation.
Figure 11:
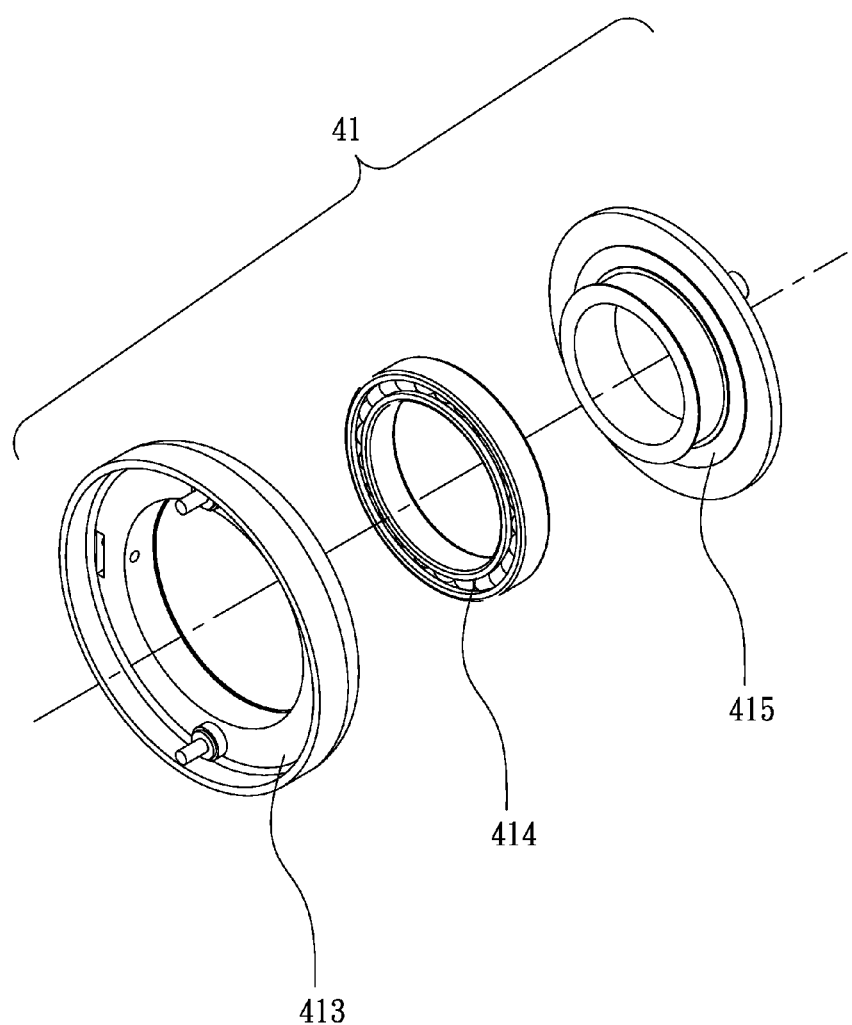
FIG. 11 is an exploded view showing a slide block of the present invention.
Figure 12:
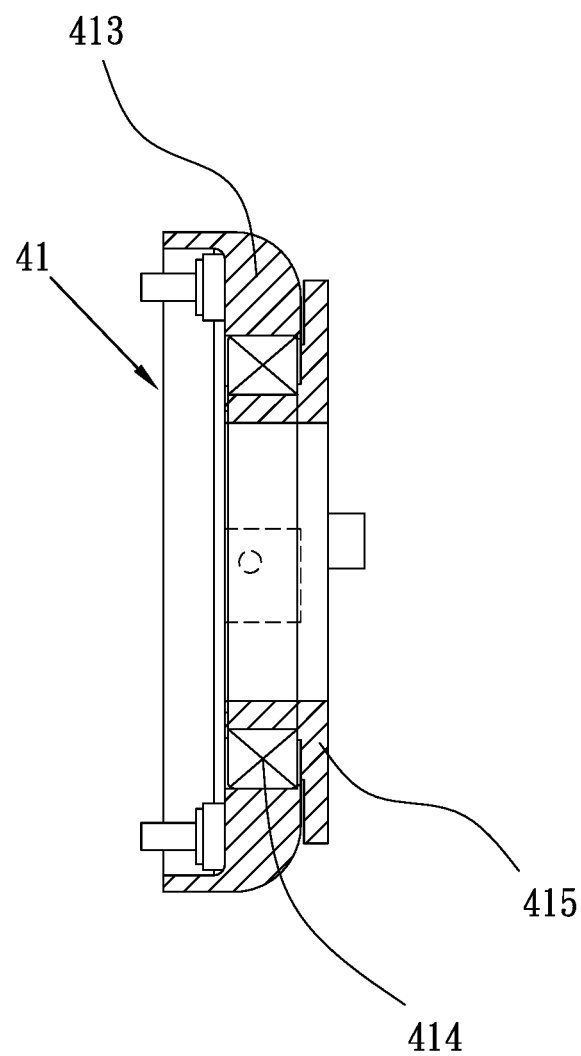
FIG. 12 is a cross-sectional view showing the slide block of the present invention in an assembled form.

Referring to FIGS. 11 and 12, the clamp slider 41 comprises a slide member 413 that is not rotary, a interfacing bearing 414, and a rotary disc 415 that is allowed to rotate. The hook terminals 351 of the elbow hook structures 35 are made in hooking engagement with the square slot pins 412 of the non-rotary slide member 413 and the rotary disc 415 that is allowed to rotate is provided with three threaded holes 4151 that receive the three spring screws 44 that extends through the clutch 43 and the intermediate ring 42 to screw to the threaded holes 4151 of the rotary disc 415, whereby the clutch 43, the intermediate ring 42, and the rotary disc 415 are fixed to each other for rotation together (as shown in FIG. 3). Further, the three screw fixing points are locate in an intermediate portion of annular surfaces of the clutch 43, the intermediate ring 42, and the rotary disc 415, rather than being closed to a central axis or an outer circumference, so that a better effect of control of pull can be achieved, the operation is more flexible with better smoothness, and skewing or warping, jamming, break, or shortening of lifespan may all be eliminated.

Figure 13:
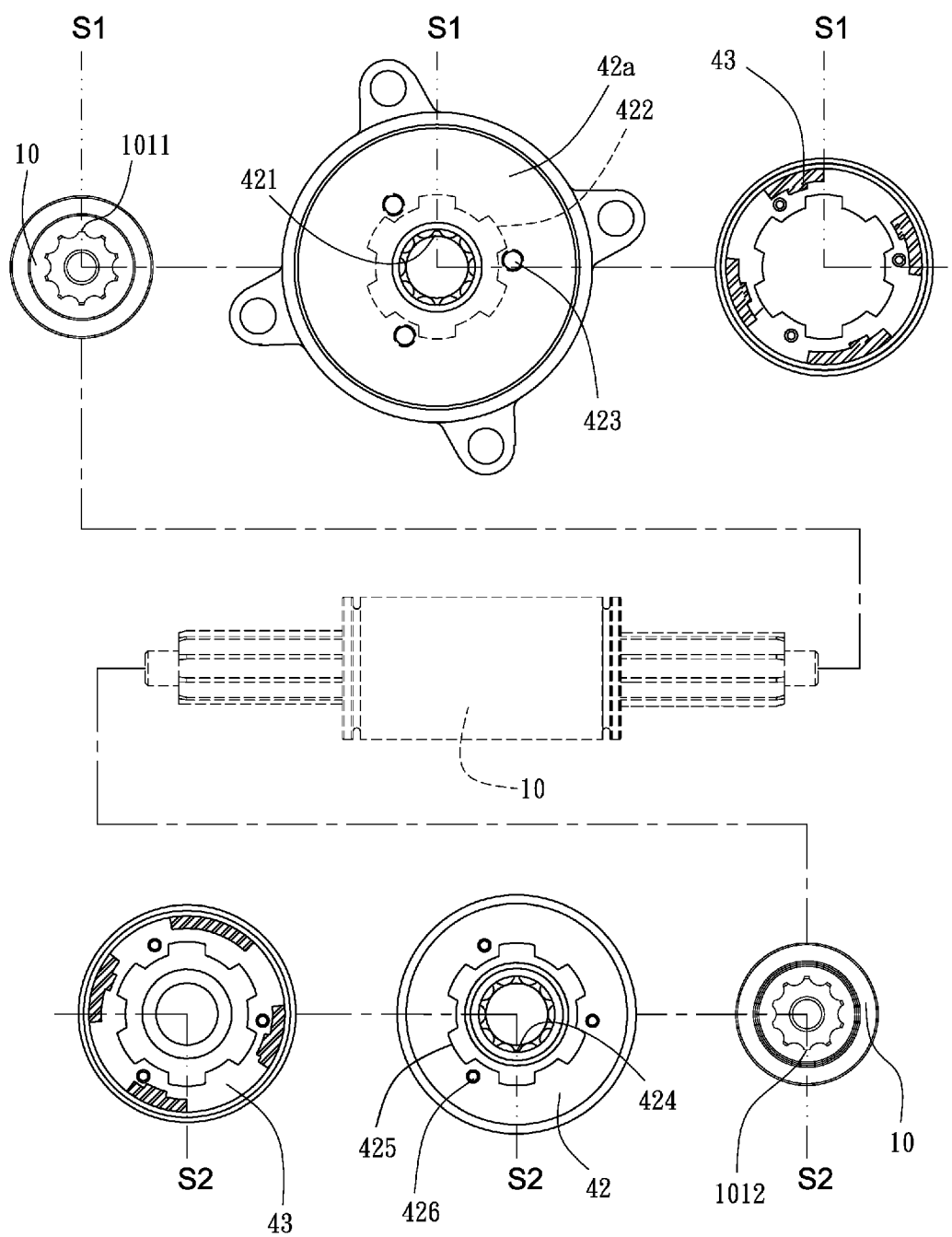
FIG. 13 is a schematic view illustrating assembly of a foolproof structure of the embodiment of the present invention.

Referring to FIG. 13, the present invention comprises a foolproof structure for the two cranks being set in a condition of being angularly shifted by 180 degrees, wherein the right-hand side spline 101 of the axle 10 is provided with short tooth 1011 facing upward and the intermediate ring-sprocket assembly 42a is provided with a short tooth trough 421 facing upward so as to ensure the intermediate ring-sprocket assembly 42a can only be assembled with the right-hand side spline 101 of the axle 10 at a sole correct position (S1). The intermediate ring-sprocket assembly 42a comprises six spline plate 422 that are arranged to match positions of three through holes 423 to ensure there is only one correct position for assembly of the clutch 43. The left-hand side spline 101 of the axle 10 is provided with a short tooth 1012 facing downward and the intermediate ring 42 is provided with a short tooth trough 424 facing downward to ensure the intermediate ring 42 can only be assembled with the left-hand side spline 101 of the axle 10 at a sole correct position (S2). The intermediate ring 42 comprises six projection teeth 425 that are arranged to match positions of three through holes 426 to ensure there is only one correct position for assembly of the clutch 43.

Figure 14:
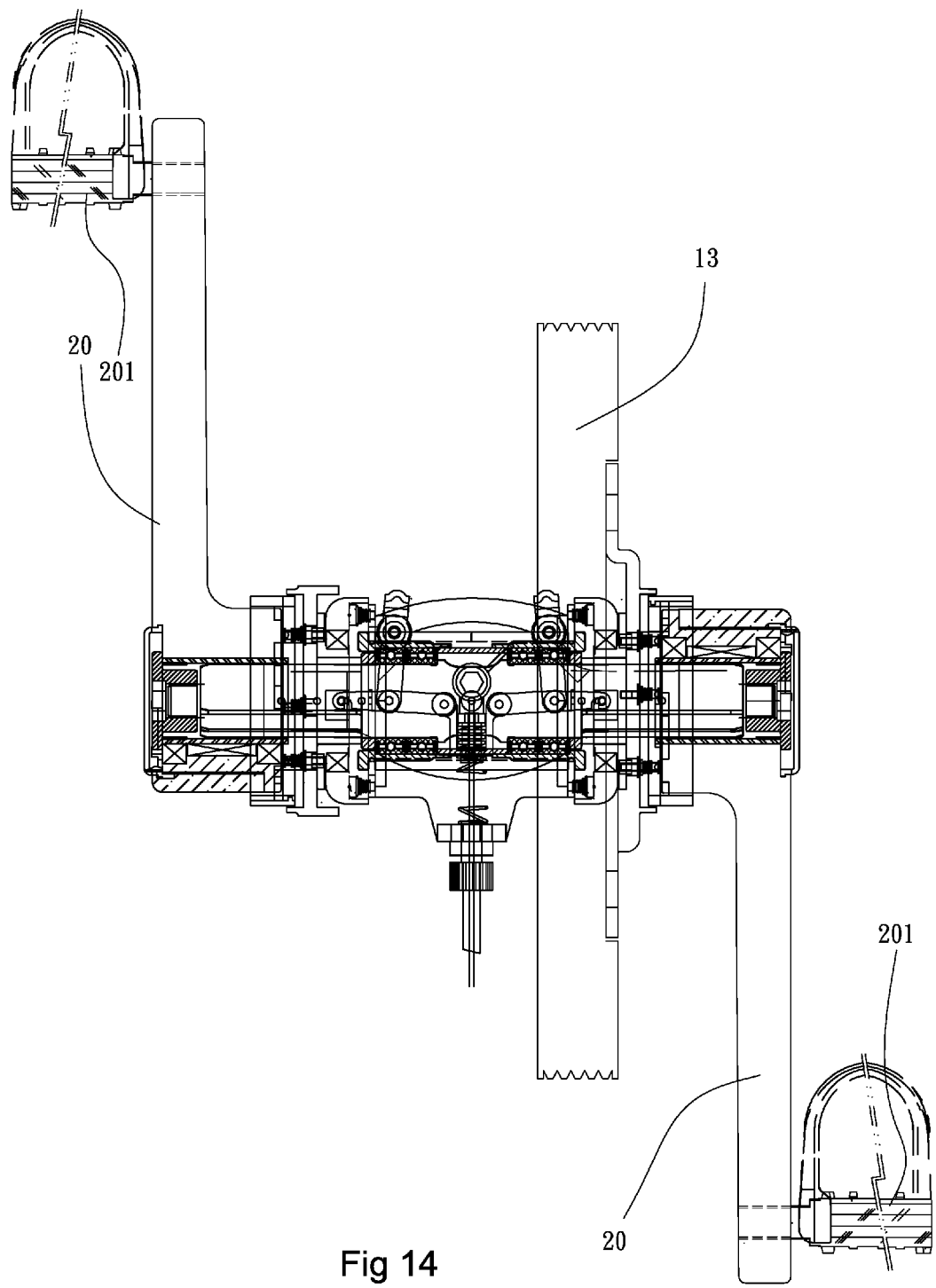
FIG. 14 is a schematic view illustrating a different example of the present invention embodied as a pulley of a bodybuilding bike.

Referring to FIG. 14, the transmission device of the present invention is of completely identical structure for application to both a bodybuilding bike and a bicycle, but with one single difference that the bicycle involves the use of the sprocket assembly 11 (see FIG. 2), while the bodybuilding bike involves the use of a pulley or belt-driving wheel 13. Thus, based on the mode of use for either a bicycle or a bodybuilding bike, the sprocket assembly 11 and the pulley 13 may be interchangeably used.

Figure 15:
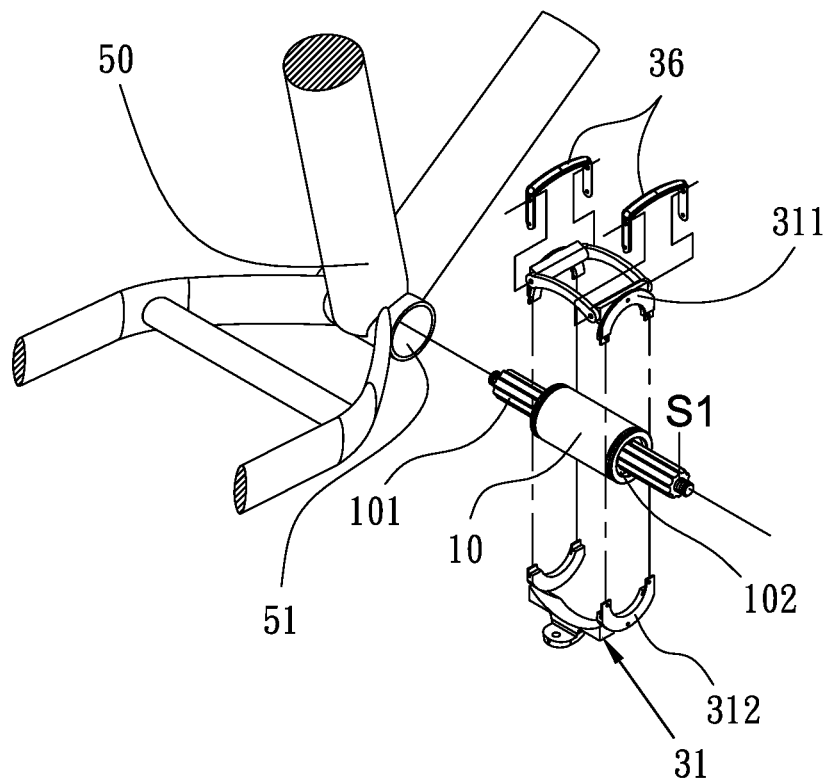
FIG. 15 is a perspective view illustrating an axle of the present invention mounted to a frame.

Referring to FIG. 15, a prior art clamp involves a unitary integrated design, which suffers being difficult to install, nor it can be reinforced, for the installation or assembly requires proper deformation for fitting. On the other hand, the present invention is totally free of such problems and the clamp body 31 of the present invention is composed of an upper clamp member 311 and a lower clamp member 312 so that the assembly requires no deformation of parts and in addition, the upper clamp member 311 and/or the lower clamp member 312 can be reinforced or strengthened by themselves and such reinforcement or strengthening does not affect the assembly. Such an arrangement of the upper clamp member 311 and the lower clamp member 312 makes it easier to assemble with the frame 50 in a trouble-free manner.

Figure 16:
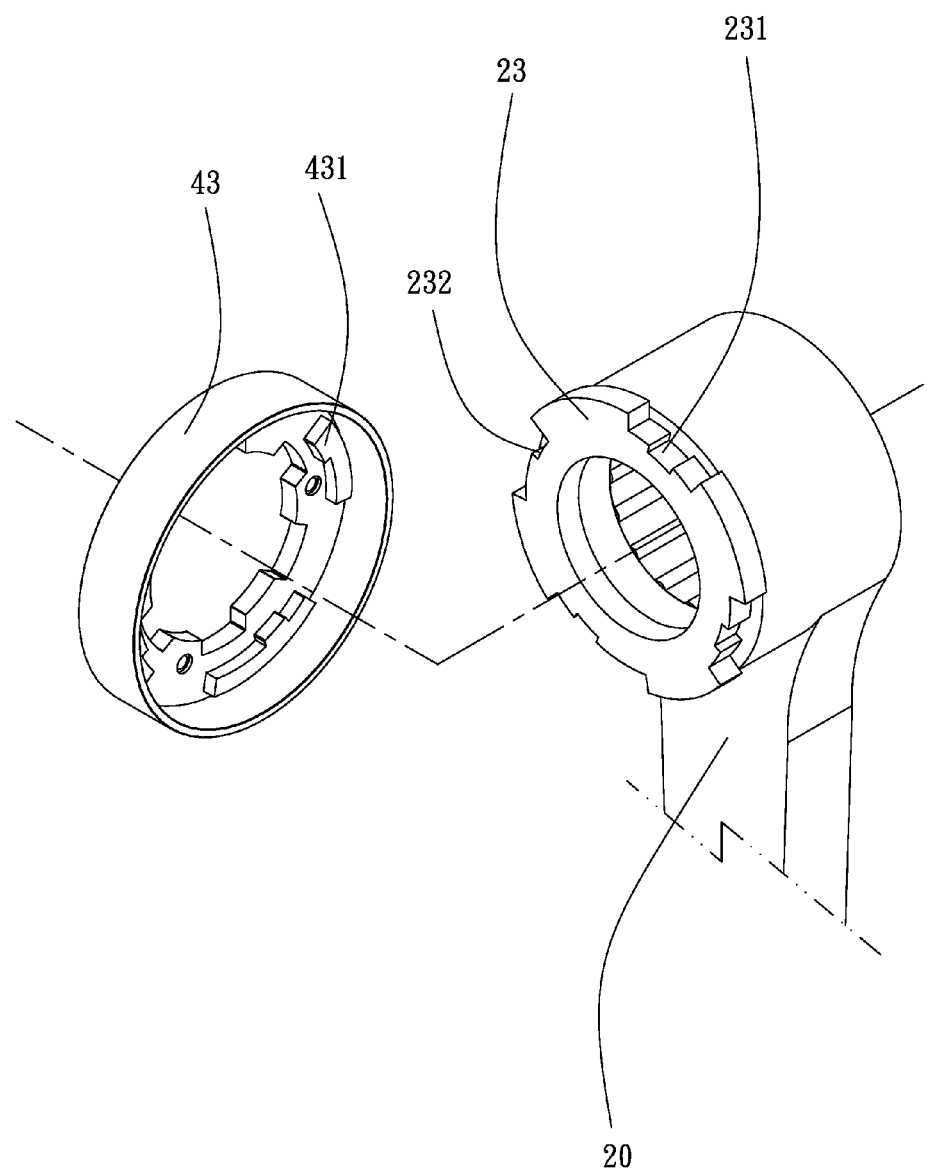
FIG. 16 is a perspective view showing a crank and a clutch of the present invention in a condition of being detached from each other.

Referring to FIG. 16, in the transmission device for bodybuilding devices or bicycles, the clutch tooth formation 23 of the cranks 20 and the clutch tooth formation 431 of the clutch 43 are of shapes that mate and engage with each other. Such shapes can be ones of various shapes, such as T-shapes 231 or L-shapes 232. Tips of the T-shapes 231 or the L-shapes 232 allow for significantly improving the drawbacks of the prior art where tooth width and clearance are great and the tips require only small width and small clearance.

It can be seen from the above that the transmission device for bodybuilding devices or bicycles according to the present invention is indeed a novel design that involves a wire control assembly comprising a half-half joint arrangement for easy assembly with parts thereof being formed of plastics and parts taking the same specifications as regular or known bicycles, where assembly for centering is achieved with recess-projection engagement for better assembly accuracy and the left-hand side and right-hand side cranks are securely fixed by using nuts of different handedness to prevent undesired loosening, such that designs of parts are oriented toward being simplified and more accurate to greatly lower down failure rate.

Illustrated above are the embodiments of the present disclosure, which should not be considered limitative to the scope of the invention. Therefore, any equivalent substitutions or variations to the structures or processes disclosed in the specification and the drawing of the present disclosure, or a direct or indirect application of the invention to the other technical fields should be considered as part of the present disclosure.

What is claimed is:

1. A transmission device for a bodybuilding device or bicycle, comprising:
an axle, wherein the axle is coupled via a spline to a sprocket assembly, the axle having two ends respectively receiving axle sleeves fit thereto;
two cranks, which respectively comprises a right-hand side crank and a left-hand side crank, the two cranks each having operation end axle bores in which a one way bearing is mounted, such that the two cranks are each coupled through a respective one way bearing to a respective outer circumference of the axle sleeves, the two cranks each having surfaces facing towards the axle and provided with a clutch tooth formation;
a wire control assembly, which comprises a clamp body comprising an upper clamp member and a lower clamp member mating and combinable with each other, the clamp body being connected through a wire to a wire control switch, an opposite end of the wire being connected through a spring to two elbow hook structures; and
two clutch control assemblies, which each comprise a clamp slider, an intermediate ring, and a clutch, the intermediate ring of one of the clutch control assemblies comprises the sprocket assembly that is structured as an intermediate ring-sprocket assembly, wherein the clamp slider, the intermediate ring or the intermediate ring-sprocket assembly, and the clutch of a respective clutch control assembly are coupled to each other through three spring screws, the clamp slider being provided with a spring bar positioned against and engaging a side recess of the clamp body, the clamp slider having two sides provided with a square slot pin for hooking engagement with the elbow hook structures to form the transmission device.

2. The transmission device for a bodybuilding device or bicycle as claimed in claim 1, wherein the right-hand side crank is fastened with a left-handed nut and the left-hand side crank is fastened with a right-handed nut to prevent loosening during an alternating operation.

3. The transmission device for a bodybuilding device or bicycle as claimed in claim 1, wherein the axle has sides that comprise a recessed section formed therein, the recessed section being structured to receive a projecting portion of each axle sleeve to insert therein for correct alignment with a central axis of the axle.

4. The transmission device for a bodybuilding device or bicycle as claimed in claim 1, wherein the upper clamp member and the lower clamp member are made of plastics.

5. The transmission device for a bodybuilding device or bicycle as claimed in claim 1, wherein the cranks each comprise a clutch tooth formation that is engageable with and mate, in shape, with a clutch tooth formation of the clutches and wherein the shape is one of a T-shape and an L-shape, which has a tip having a width and clearance.

6. The transmission device for a bodybuilding device or bicycle as claimed in claim 1, wherein the wire control assembly comprises a pair of pivot shafts that are provided with four first pivot points and four second pivot points, the four first pivot points being rotatably coupled to the clamp body, the four second pivot points each being rotatably coupled to a pivot end of a respective hook terminal, and two of the second pivot points each being rotatably coupled to an end of a respective elbow joint, the spring having an end supported on the clamp body and an opposite end supported on a pivot seat, the pivot seat comprising a compression spring received therein and coupled to a wire fixing assembly, the wire fixing assembly comprising a transverse screw extending through the pivot seat and the compression spring to screw to a wire fixing seat and a longitudinal screw receiving an end of the wire to wrap therearound and screwed to the wire fixing seat.

7. The transmission device for a bodybuilding device or bicycle as claimed in claim 1, wherein the clamp slider of a clutch control assembly comprises a slide member that is not rotary, an interfacing bearing, and a rotary disc that is rotatable, the elbow hook structures having hook terminals in hooking engagement with a square slot pin of the slide member, the rotary disc being provided with three threaded holes to receive the three spring screws to extend through the clutch and the intermediate ring of a clutch control assembly to screw to the threaded holes of the rotary disc, the three spring screws being arranged at an intermediate portion of annular surfaces of the clutch, the intermediate ring, and the rotary disc.

8. The transmission device for a bodybuilding device or bicycle as claimed in claim 1, wherein the transmission device comprises a foolproof structure for the two cranks being set in a condition of angularly shifting away from each other by 180 degrees, wherein the spline on a right hand side of the axle comprises a short tooth facing upward and the intermediate ring-sprocket assembly comprises a short tooth trough facing upward to ensure the intermediate ring-sprocket assembly is allowed to assemble with the right-hand side spline of the axle at a sole correct position (S1), the intermediate ring-sprocket assembly comprising six projection teeth arranged to match positions of three through holes for assembling with one of the clutches; and the spline on a left hand side of the axle comprises a short tooth facing downward and the intermediate ring comprises a short tooth trough facing downward to ensure the intermediate ring is allowed to assemble with the left-hand side spline of the axle at a sole correct position (S2), the intermediate ring comprising six projection teeth arranged to match positions of three through holes for assembling with another one of the clutches.

9. The transmission device for a bodybuilding device or bicycle as claimed in claim 1, wherein the sprocket assembly is used in combination with a bicycle and is replaceable with a pulley for use in combination with a bodybuilding bike.

* * * * *